Sept. 25, 1962 G. W. LORD 3,055,249

TAPE SLITTING APPARATUS

Filed Sept. 2, 1958 2 Sheets-Sheet 1

INVENTOR
GEORGE WILLIAM LORD
BY Larson and Taylor
ATTORNEY

Sept. 25, 1962 G. W. LORD 3,055,249

TAPE SLITTING APPARATUS

Filed Sept. 2, 1958 2 Sheets-Sheet 2

INVENTOR
GEORGE WILLIAM LORD
BY Larson and Taylor
ATTORNEY

United States Patent Office 3,055,249

Patented Sept. 25, 1962

3,055,249

TAPE SLITTING APPARATUS

George William Lord, Wembley, England, assignor to National Research Development Corporation, London, England, a British corporation Filed Sept. 2, 1958, Ser. No. 758,315

2 Claims. (Cl. 83—501)

This invention relates to tape slitting apparatus and has particular reference to apparatus for slitting metal tapes in the thickness range 0.004 inch to .0002 inch or less.

Existing tape slitting apparatus comprises an assembly of cutters consisting of one or more pairs of co-operating cutter discs. One member of each pair of discs is in the form of a dished plate having a peripheral cutting edge while the other member is of heavier, more rigid construction. Existing apparatus requires exceptional precautions in setting up in order to slit satisfactorily metal tapes whose thickness is .001 inch or less otherwise "burring" of the edges of the slit tape is produced.

It is an object of the present invention to provide improved tape slitting apparatus able to slit thinner tape than existing apparatus without producing edge burr.

According to the present invention, tape slitting apparatus includes a balanced assembly of pairs of peripherally overlapping and co-operating cutter discs, one disc of each pair being flexible and of dished form with a cutting face normal to the axis of the disc, and the other disc of the pair being rigid and maintained in contact with the cutting face of its co-operating disc under a pressure sufficient to distort part of the cutting face by an amount sufficient to move the area of contact of the discs away from the outer edge of the cutting face.

Preferably, the rigid disc of each pair is driven, the flexible disc of a pair being driven by frictional engagement with the rigid disc or the tape being slit or both.

By way of example only, a pair of co-operating cutter discs for apparatus embodying the invention and suitable for slitting metal tape will now be described in greater detail with reference to the accompanying drawings of which:

Figure 1:
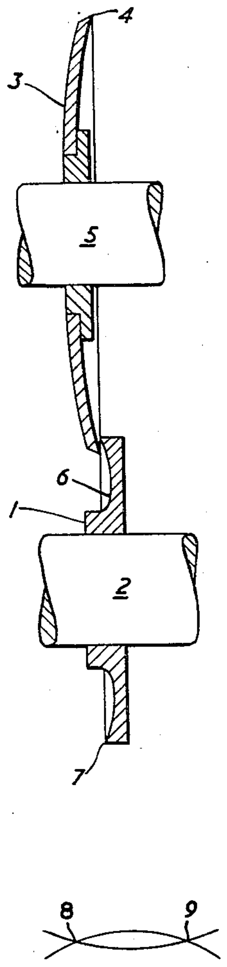
FIG. 1 is a side elevation partly in section of co-operating cutter discs of known apparatus which do not form part of the present invention.

In FIGURE 1 is shown a rigid disc 1 mounted upon a driving shaft 2 and in engagement with a co-operating dished flexible cutter disc 3 having a peripheral cutting edge 4. The disc 3 is shown mounted upon a shaft 5. It will be seen that the disc 1 has a concave face 6 ground to produce a sharp edge 7 for supporting the tape whilst it is cut by edge 4.

The discs 1 and 3 overlap slightly and, due to the dished shape of the disc 3, cutting engagement occurs at two points 8 and 9 both lying in cutting edges 4 and 7. Absence of clearance at the initial point of engagement, i.e. points 8 or 9 according to direction of rotation, is found to produce "burring" of the edges of the cutter blade 3 with consequent damage to the edge of strips slit by passage between the discs.

Figure 2:
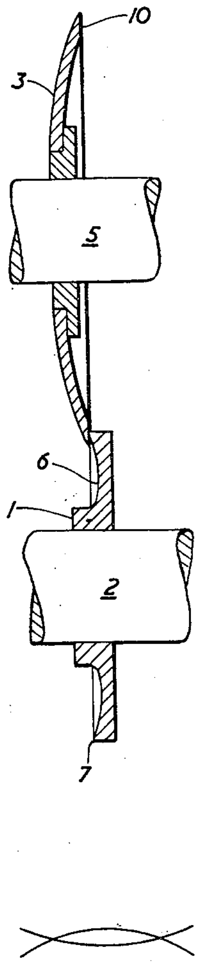
FIG. 2 is a side elevation partly in section of co-operating cutter discs for a machine embodying the invention before engagement under pressure.

FIGURE 2 shows a pair of co-operating cutters modified according to the invention but before final assembly in a stressed condition. The flexible cutter disc 3 has a flat face 10 ground on its concave side, this as shown in FIGURE 2, lies in a plane normal to the axis of the disc, i.e. normal to the shaft 5 on which the disc 3 is mounted.

Engagement between the cutting edge 7 on the rigid disc 1 and face 10 now occurs along the entire length of the line of contact.

Figure 3:
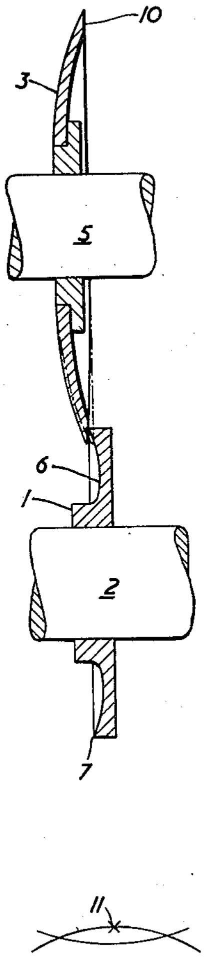
FIG. 3 shows the discs of FIGURE 2 under pressure.

If now, the rigid disc 1 is pressed against the flexible disc 3 as shown in FIGURE 3, distortion of the disc 3 is produced and a limited part of face 10 becomes inclined to the shaft 5 thus limiting engagement between the face 10 and the cutting edge 7 to a small area in the vicinity of point 11, a point spaced from the outer edge of the face 10. The position of the disc 3 in its distorted condition is shown in full line, the broken lines depicting the undistorted position of the disc as shown in FIGURE 2.

Distortion of the face 10 described above produces cutting clearance between the discs on each side of the point 11 and this is found to eliminate "burring." The clearance can be adjusted as desired by varying the amount of overlap of the discs.

The flat face 10 is formed by grinding and then polishing the face on a piece of plate glass using, firstly 1000 mesh Carborundum and then jewellers' rouge.

FIGURE 3 shows a single pair of co-operating cutter discs but it will be appreciated that the apparatus employs an assembly of pairs of which the flexible members are mounted upon a common shaft 5 and the co-operating rigid members on a common shaft 2. Discs on the same shaft are mounted "back to back" and/or "front to front" to produce a balanced assembly. This is necessary because side thrusts are developed at the cutting points 11 by the stressing of the flexible discs and the alternate left and right mounting balances-out such thrusts which although of small magnitude otherwise adversely affect slitting.

For slitting very thin tapes, the assembly must also be symmetrical about the centre line of the tape this involving even numbers of sets of cutting blades hence it will be appreciated that it is possible to slit odd numbers only of tapes from a parent tape. Thus, 1, 3, 5, etc., tapes can be slit but not 2, 4, 6, etc., as this would involve unbalanced side thrusts on the parent tape.

Figure 4:
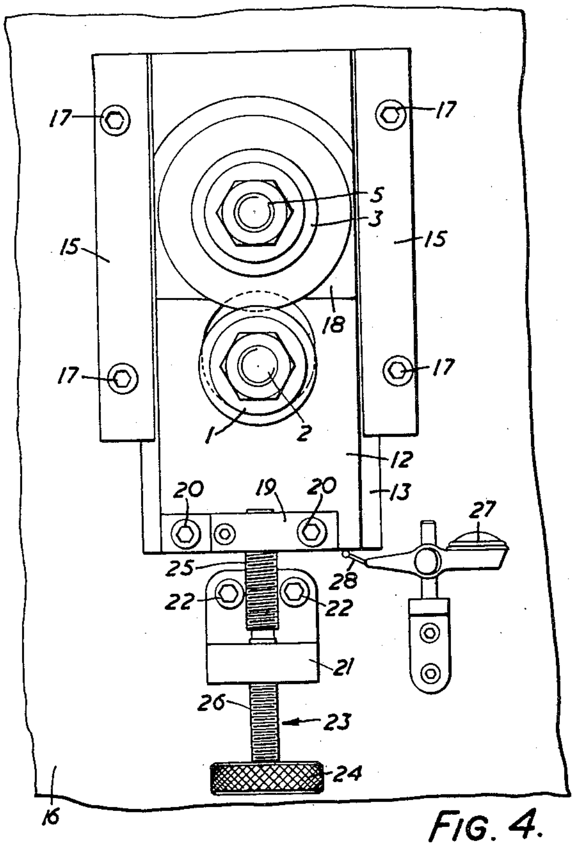
FIG. 4 is a side elevation of an embodiment of the invention showing means by which the amount of peripheral overlap between the cutter discs may be adjusted.
Figure 5:
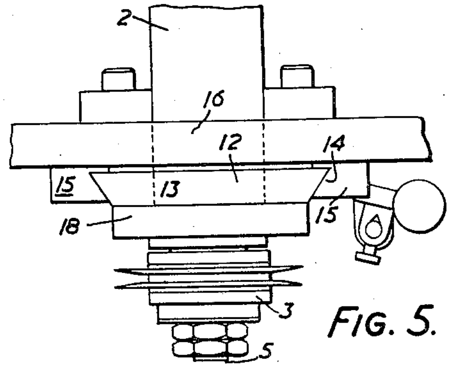
FIG. 5 is a plan view of FIGURE 4.

In FIGURES 4 and 5 the shafts 2 and 5 together with the discs 1 and 3 are shown mounted so that the distance between the axes of the shafts, and hence the amount of peripheral overlap of the discs, may be adjusted.

A plate 12 is provided with integral side portions 13; each of these side portions 13 co-operates with a channel 14 cut in each of a pair of guiding members 15 so that the plate 12 is able to slide along the channels 14. The guiding members 15 are securely fixed to a back plate 16 by means of screws 17. Shaft 5 carrying the disc 3 is mounted in bearings on a mounting plate 18 which is rigidly secured to the sliding plate 12, whilst the shaft 2 carrying the disc 1 is mounted in bearings attached to the back plate 16. The shaft 2 passes through a hole in the sliding plate 12 and to allow for movement of this plate over the required range without fouling of the shaft 2 this hole is elongated in the direction of travel of the plate 12.

The lower end of the plate 12 is attached to a differential screw mechanism of known type. This consists of a nut 19 mounted on the plate 12 by means of screws 20, of another nut 21 mounted on the back plate 16 by means of screws 22 and a screw 23 provided with a head 24 by which the screw may be operated. The screw is provided with two threaded portions 25 and 26 each of different pitch which engage with like threads provided on the nuts 19 and 21 respectively so that on rotation of the head 24 movement of the plate 12 occurs in the channels 14. A micrometer gauge 27 is mounted with its moving arm 28 in contact with the lower edge of the plate 12 enabling the amplitude of movement of the plate 12 to be accurately determined.

Movement of the plate 12 causes the shaft 5 and the disc 3 to move in a direction dependent upon the direction of rotation of the head 24 and thus alters the amount of peripheral overlap of the discs 1 and 3. This feature just described is of importance as it provides a sensitive means of adjusting the clearance between the discs so that burring and channelling of the cut edges of the tape can be avoided.

The width of tapes slit from a parent tape will depend upon the spacing between adjacent pairs of discs and this can be varied by employing rigid discs of preselected thickness or by the employment of spacing washers.

Normally, the shaft 2 is driven and the flexible discs 3 of each pair of co-operating discs is driven by frictional engagement with the driven disc and/or the tape being slit. Stripping of slit tape from the discs is effected in the usual way by means of metal rings loosely mounted between adjacent pairs of co-operating discs.

The apparatus also includes means for coiling the slit tape which comprise drums upon which the slit tape is wound. To avoid excessive separation of the cutter assembly and the drums which would otherwise be necessary to effect sufficient separation of adjacent slit tapes to enable them to be coiled, the drums are arranged in sets positioned one above the other. There might, for example, be two sets of drums, an upper set and a lower set spaced from the cutter assembly by about a foot or eighteen inches. Adjacent slit tapes are led to drums in different sets thus providing the necessary clearance without undue separation of cutter assembly and drums. Thus the first, third and fifth slit tapes of the parent tape may be coiled on drums in the upper set while the second and fourth are coiled on drums in the lower set.

To use the apparatus, the discs are set in motion and the parent tape to be slit is fed through the cutter assembly, via guides. After slitting, the tape is coiled on the drums which are driven. It is of course essential to keep the tape and cutters absolutely clear of dust and to this end, the parent strip is passed between felt pads soaked in industrial alcohol which is also used to lubricate the cutters. A transparent cover, for example a methacrylate cover, is placed over the working parts during use to reduce further possibility of dust falling on the mechanism during slitting. When not in use, the entire machine is covered up. To reduce still further the possibility of contamination by dust the machine is operated in an atmosphere of filtered air.

I claim:

1. Metal tape slitting apparatus including a first and a second shaft, driving means for rotating one of said shafts, a first series of rigid cutter discs mounted in spaced axial relationship on said first shaft, a circumferential cutting edge on each rigid cutter disc, a second series of dish-formed cutter concave-convex discs mounted in space axial relationship on said second shaft, the said dish-formed cutter discs being flexible, a circumferential cutting face on the concave side of each dish-formed flexible disc located adjacent the peripheral edge of the disc, for co-operation with the cutting edge of a rigid disc, said cutting face of a flexible disc being normal to the axis of the disc, the first series being in a co-operating peripherally overlapping relationship with said second series a radial distance less than the radial dimension of said face, wherein any pair of adjacent rigid cutter discs and the co-operating dish-formed cutter discs form an axial-thrust-balanced assembly, non-resilient means for maintaining said cutting edges of the rigid discs each in contact with the cutting face of its co-operating flexible disc under a pressure sufficient to flex the flexible disc and to distort the overlapping portion of its cutting face thus to displace the location of contact between the flexible and rigid discs away from the bounding edges of each cutting face, and means for relatively moving the first and second shafts to adjust the amount of peripheral overlap of said first and second series of discs.

2. Metal tape slitting apparatus including a first shaft and a second shaft, driving means for rotating said first shaft, a first series of rigid cutter discs mounted in spaced axial relationship on said first shaft, an annular recess in one face of each rigid disc, a cutting edge on each rigid disc defined by the recess and the cylindrical bounding surface of a rigid disc, a second series of concave-convex dish-formed cutter discs mounted in spaced axial relationship on the concave side of said second shaft, the said dish-formed discs being flexible, a circumferential cutting face on each dish-formed flexible disc and located adjacent the peripheral edge of the disc for co-operation with the cutting edge of a rigid disc, said cutting face of a flexible disc being normal to the axis of the disc, the said first series being in a co-operating peripherally overlapping relationship with the said second series a radial distance less than the radial dimension of said face, wherein any pair of adjacent rigid cutter discs and the co-operating dish-formed discs form an axial-thrust, non-resilient means for maintaining the cutting edges of said rigid discs each in contact with the cutting face of its co-operating flexible disc under a pressure sufficient to flex the flexible disc and to distort the overlapping portion of its cutting face thus to displace the location of contact between the flexible and rigid cutter discs away from the bounding edges of each cutting face, and means for moving said second shaft in a direction parallel to a line joining the centres of said first and second shafts.

References Cited in the file of this patent

UNITED STATES PATENTS

| | | |
|---|---|---|
| 164,920 | Judson | June 29, 1875 |
| 620,944 | Mather | Mar. 14, 1899 |
| 1,525,590 | Perrault | Feb. 10, 1925 |
| 1,754,969 | Spoor | Apr. 15, 1930 |
| 2,571,201 | Clem | Oct. 16, 1951 |
| 2,573,332 | Herman | Oct. 30, 1951 |

FOREIGN PATENTS

| | | |
|---|---|---|
| 641,235 | Germany | Jan. 25, 1937 |